United States Patent
Kurz, II

(10) Patent No.: US 12,336,522 B2
(45) Date of Patent: Jun. 24, 2025

(54) REACTIVE FISHING ROD HOLDER

(71) Applicant: Thomas Dwight Kurz, II, Hackensack, MN (US)

(72) Inventor: Thomas Dwight Kurz, II, Hackensack, MN (US)

(73) Assignee: Thomas Dwight Kurz, II, Hackensack, MN (US)

( * ) Notice: Subject to any disclaimer, the term of this patent is extended or adjusted under 35 U.S.C. 154(b) by 0 days.

(21) Appl. No.: 18/445,220

(22) Filed: May 5, 2023

(65) Prior Publication Data

US 2023/0404050 A1  Dec. 21, 2023

Related U.S. Application Data

(62) Division of application No. 16/350,362, filed on Nov. 6, 2018, now Pat. No. 11,596,136.

(51) Int. Cl.
  *A01K 97/10* (2006.01)
  *A01K 97/01* (2006.01)
  *A01K 97/12* (2006.01)

(52) U.S. Cl.
  CPC .............. *A01K 97/10* (2013.01); *A01K 97/01* (2013.01); *A01K 97/12* (2013.01)

(58) Field of Classification Search
  CPC ........................................ A01K 97/10
  USPC .................................. 43/21.2; 248/302, 520
  See application file for complete search history.

(56) References Cited

U.S. PATENT DOCUMENTS

| | | | | |
|---|---|---|---|---|
| 3,034,247 A * | 5/1962 | Lunsman | ............... | A01K 97/01 43/17 |
| 3,612,454 A * | 10/1971 | Linn | ..................... | A01K 97/10 248/314 |
| 4,517,761 A * | 5/1985 | Bleggi | ................... | A01K 97/10 43/21.2 |
| 4,565,025 A * | 1/1986 | Behrle | ................... | A01K 97/10 248/538 |
| 4,739,575 A * | 4/1988 | Behrle | ................... | A01K 97/10 248/538 |
| 5,345,708 A * | 9/1994 | Loyd | ...................... | A01K 97/10 43/21.2 |
| 6,185,855 B1 * | 2/2001 | Sizer | ...................... | A01K 97/01 43/21.2 |
| 6,484,433 B1 * | 11/2002 | Greene | .................. | A01K 97/10 248/528 |
| 7,841,125 B2 * | 11/2010 | Foss | ....................... | A01K 97/11 43/21.2 |
| 11,596,136 B2 | 3/2023 | Kurz, II | | |

(Continued)

*Primary Examiner* — Peter M Poon
*Assistant Examiner* — Danielle A Clerkley
(74) *Attorney, Agent, or Firm* — Thomas Dwight Kurz, II

(57) ABSTRACT

An improved multi functional fishing rod holder made of steel wire includes a circular base (1), compression coil (2), uniquely designed square washers (3), bolt (4), and wing nut (5) to create a stand alone fishing rod holder. In accordance with the invention the stand alone fishing rod holder can be adapted to fastening to a variety of surfaces such as a pale or wall by incorporating a "U" shaped extension arm (6) with thumb screw (7) thereby providing the ability to fasten fishing rod holder to a variety of surfaces such as a pail. In addition using "L" plate (11), spacer (9) and lock washer (10) and or mount plate (12) creates ability to mount on a flat surface such as a wall.

1 Claim, 4 Drawing Sheets

(56) References Cited

U.S. PATENT DOCUMENTS

2005/0138856 A1\* 6/2005 Hansen ................. A01K 97/01
43/21.2

\* cited by examiner

"Fig. 1A"
SIDE VIEW
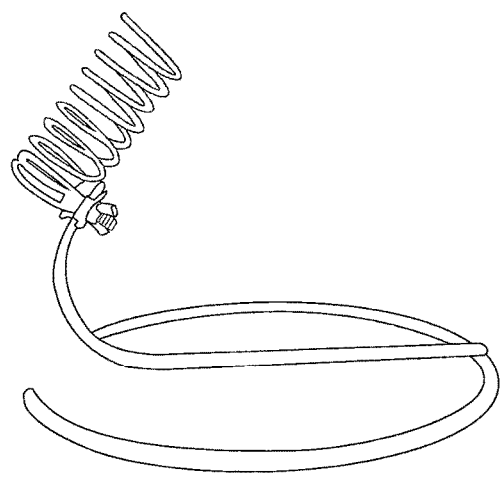
"Fig. 1B"
TOP VIEW
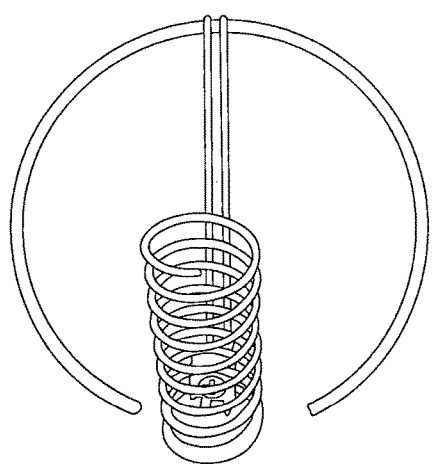
"Fig. 1C"
COMPONENTS
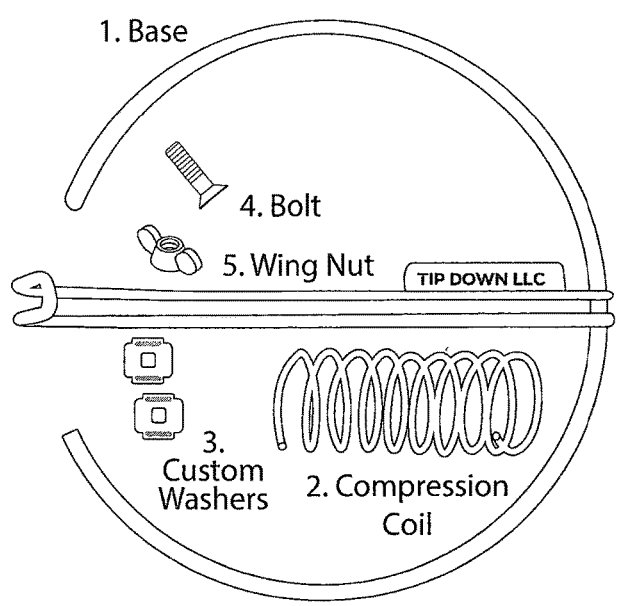

"Fig. 2A"
SIDE VIEW
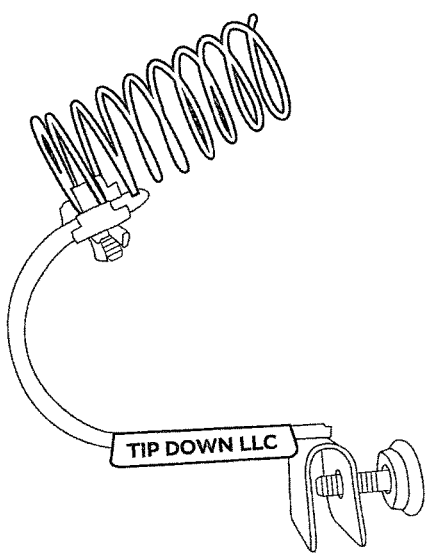
"Fig. 2B"
TOP VIEW
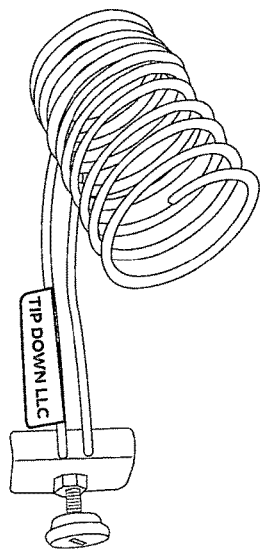
"Fig. 2C"
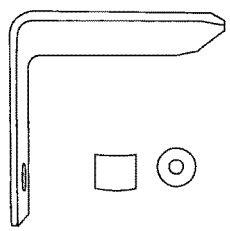
"Fig. 2D"
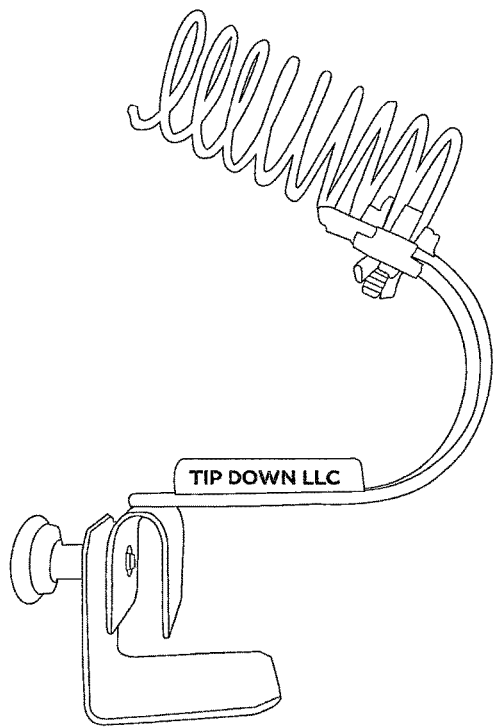

"Fig. 2E"
PARTS
2. Compression Coil
6. Extension Arm
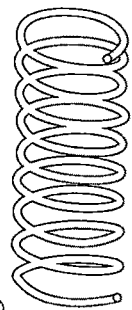
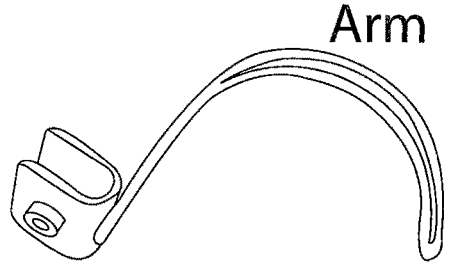
4. Bolt
5. Wing Nut
3. Custom Washers
7. Thumb Screw "Fig. 2F"
PARTS
2. Compression Coil
6. Extension Arm
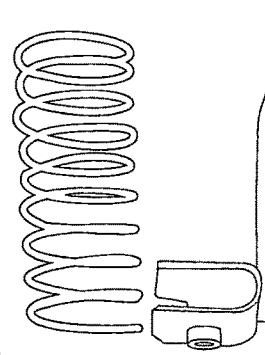
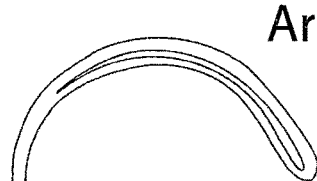
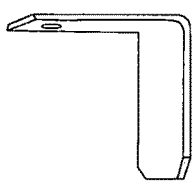
11. L Plate
4. Bolt 
9. Spacer
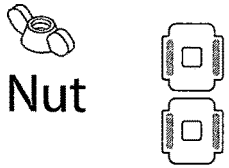
10. Lock Washer
5. Wing Nut
3. Custom Washers
7. Thumb Screw
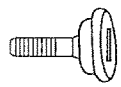
12. Mount Plate

REACTIVE FISHING ROD HOLDER

TECHNICAL FIELD

The present invention relates to ice fishing rod holders and more specifically the feature of placing fishing rod in holder securely to eliminate fishing rod from being pulled down the fishing hole, other abilities include quick removal of fishing rod from holder and or ability to leave fishing rod in the holder while reeling in the fish combined with varied adjustment options for securing and angling the fishing rod therein.

BACKGROUND OF INVENTION

Varying fishing rod holders have been available heretofore for holding fishing rods. Some are adapted for a single fishing rod; others for holding multiple fishing rods at once, either during transport or during fishing. Further, some fishing rod holders are only suitable for use in a boat when fishing open water, while others may only be suitable when fishing off a dock or shoreline.

Fishing rod holders that are adapted particularly for ice fishing have also been available heretofore because the requirements for ice fishing are different. Ice fishing rods tend to be short and light. The line is light, the bait is frequently small and light. A different technique is required as well because ice fishing takes place through a hole in the ice while fisherman sits in a fish house or out in the open on a frozen lake. The fish often tend to be sluggish and less active during winter, which can make it difficult to determine whether a fish has taken the bait. U.S. Pat. Nos. 7,322,148 and 5,038,511 are representative of prior art in this regard. The '148 patent to Coulman shows an ice rigger apparatus in which an indicator flag is released if a fish takes the bait. This is typically known as a tip down. The '511 patent to Gessner shows a collapsible fishing rod holder that is simply adapted to hold rod and reel off the ice without any indication or reacting to a biting fish or the ability of locking rod and reel into holder preventing it from being pulled free by a biting fish.

A need has thus arisen for a new and unique fishing rod holder that can be particularly adapted to address both securing rod to holder while fishing as a stand alone unit or connecting holder to stationary surface.

BRIEF DESCRIPTION OF ART, "FIG. 1, A, B, C" & "FIG. 2, A, B, C. D, E, F."

FIG. "1A", side view of fishing rod holder.

FIG. "1B", top view perspective of stand alone fishing rod holder.

FIG. "1C", art displays unassembled components numbered 1, 2, 3, 4 and 5 which is total of components creating design for FIG. 1A & FIG. 1B.

FIG. "2A", side view

FIG. "2B", top view

FIG. "2C", three additional components, "L" bracket, spacer, lock washer allowing holder to connect to a flat surface, extension arm (6), thumb screw (7), FIG. "2D" "L" plate (11), spacer (9), lock washer (10), embodied to FIGS. 2A & B.

FIG. "2E", components of FIG. 2, A, B, D embodied.

FIG. "2F", components numbered 2 through 12 reflecting mountable designs of "FIGS. 2" A,& B.

DETAILED DESCRIPTION

FIG. 1A Top View, and FIG. 1B Side View.

Referring now to art, wherein like reference numerals designate like or corresponding elements throughout the views, with particular reference to FIG. 1C, base (1) which is made of steel wire of circular shape approximately 10 inches in diameter (but not limited to) with extension arm consisting of two straight steel wires extending from center of base then curving up (approximately 90 degrees) and joined together closing the gap of two straight wires. As will be explained hereinafter, the holder FIG. 1A top view, FIG. 1A, side view FIG. 1B, display unique design which enables fishing rod holder to support rod above ice at variety of angles and set on ice next to ice hole entirely stand alone and not connected to anything while supporting fishing rod. Compression coil (2) of FIG. 1C is embodied to base 1 using parts 3, (uniquely designed square washers with bend on two opposite ends allowing ability to lock and (4), (5) tightening creating ability to adjust compression coil to different part of the curved extension of base 1 while allowing rod and reel to be threaded into the compression coil with reel stem securing rod and reel in a way it is locked to holder whereby it can remain in holder while reeling in a fish.

FIG. 2A, Side View.

FIG. 2B, Top View.

Extension arm (6) consists of two steel wires starting at U shaped steel and threaded component to receive thumb screw 7 which will fasten extension arm to variety of stationary items including five gallon pail or mount plate fixed to stationary surface. Two steel wires of (6) extension arm enjoin together closing gap at end of "J" shaped curve of arm, this will allow compression coil (2) to then be connected to extension arm with uniquely designed square washers (3), bolt (4) and wing nut (5). The curve of extension arm enables sliding compression coil (2) to a variety of positions establishing the direct angle the fishing rod points to be adjustable. The steel components which create the adjustable feature of rod angle combined with means to connect rod holder to a variety of surfaces addresses new features for ice fishing rod and reel holders. Finally the ability to thread rod and reel into compression coil locking it securely completes the description of features which compliment current ice fishing rod holders being used.

FIG. 2C Components (6) and (7)

The added components in FIG. 2C (specifically labeled (6) and (7) of FIG. 2E reflect new means of using holder which allow connecting fish rod holders to a variety of surfaces combined with adjustable ability pointing rod and reel side to side or up and down.

FIG. 2D components (8) and (9) scheduled, lock washer and spacer threaded on thumb screw (7). As art reflects the total number of components shown in FIG. 1, A, B, C & FIG. 2A, B C. D, E are each labeled 1 thru 7, with a total of twelve components numbered and displayed in FIG. 2F, thereby providing a complete portrayal of all components used to accomplish varied abilities of invention.

The invention claimed is:

1. An improved fishing rod and reel holder consisting of:
    a circular base made of steel wire and approximately 10 inches in diameter;
    an extension arm made of two steel wires affixed to an edge of the base and extending inward across the diameter; a gap between the two steel wires, each of the steel wires having a first end affixed to the edge of the base, and a second end joined to each other to close the gap at the second end; the extension arm defining a guide route that extends across the diameter and curves upward at approximately 90 degrees in an arc shape, the arc shape at a location above the base and opposite from the first end of the steel wires;

a compression coil for receiving a rod having a reel, the compression coil slideable and removably secured at multiple locations along the guide route, the compression coil removably secured to the guide route with two flanged square washers, a bolt, and wing nut;

whereby the extension arm enables the compression coil to position a rod and reel above ice at a variety of angles, and adjust the rod and reel vertically and horizontally in order to reel in fish while the rod and reel remain in the holder.

* * * * *